US009463736B2

(12) United States Patent
Salter et al.

(10) Patent No.: US 9,463,736 B2
(45) Date of Patent: Oct. 11, 2016

(54) ILLUMINATED STEERING ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Pietro Buttolo, Dearborn Heights, MI (US); Diane Carole Snoeyink, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/851,726

(22) Filed: Sep. 11, 2015

(65) Prior Publication Data
US 2015/0375678 A1 Dec. 31, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| B60Q 1/00 | (2006.01) |
| B60Q 1/26 | (2006.01) |
| B60Q 3/02 | (2006.01) |
| F21K 99/00 | (2016.01) |
| B60Q 3/00 | (2006.01) |
| H05B 37/02 | (2006.01) |
| B60Q 1/14 | (2006.01) |
(Continued)

(52) U.S. Cl.
CPC ............ *B60Q 3/024* (2013.01); *B60Q 1/1469* (2013.01); *B60Q 3/008* (2013.01); *B60Q 3/0293* (2013.01); *F21K 9/56* (2013.01); *H05B 37/0218* (2013.01); *H05B 37/0227* (2013.01); *B60Q 3/042* (2013.01); *F21W 2101/02* (2013.01); *F21W 2101/08* (2013.01); *F21Y 2101/02* (2013.01); *Y02B 20/48* (2013.01)

(58) Field of Classification Search
CPC .. B60Q 1/1469; B60Q 1/1476; B60Q 3/088; B60Q 3/024; B60Q 3/0293; B60Q 3/042; F21K 9/56; H05B 37/0218; H05B 37/0227
USPC ................. 362/488, 491, 509–511, 543–545
See application file for complete search history.

(56) References Cited

U.S. PATENT DOCUMENTS

| 5,709,453 A | 1/1998 | Krent et al. |
| 6,117,362 A | 9/2000 | Yen et al. |
(Continued)

FOREIGN PATENT DOCUMENTS

| CN | 101337492 A | 1/2009 |
| CN | 201169230 Y | 2/2009 |
(Continued)

*Primary Examiner* — Jason Moon Han
(74) *Attorney, Agent, or Firm* — Vichit Chea; Price Heneveld LLP

(57) ABSTRACT

A lighting system for a vehicle steering assembly is provided herein. The lighting system includes a member extending from a steering column. A light source is disposed on a steering wheel. A first photoluminescent structure is disposed on the member and configured to luminesce in response to excitation by the light source. In some embodiments, the light source may implement a thin design, thereby helping to fit the light source into small package spaces of the vehicle where traditional light sources may not be practicable.

20 Claims, 13 Drawing Sheets

(51) Int. Cl.
*F21W 101/02* (2006.01)
*F21W 101/08* (2006.01)
*F21Y 101/02* (2006.01)
*B60Q 3/04* (2006.01)

(56) References Cited

U.S. PATENT DOCUMENTS

| | | | |
|---|---|---|---|
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2* | 2/2005 | Ramamurthy | B60Q 1/1469 362/482 |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,629,877 B2 | 12/2009 | Lvovskiy et al. | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,538,628 B2 | 9/2013 | Backman | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0111324 A1 | 4/2014 | Lisseman et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

ILLUMINATED STEERING ASSEMBLY

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lighting system for a vehicle is disclosed. The lighting system includes a member extending from a steering column. A light source illuminating at least a portion of the member is disposed within the vehicle. A first photoluminescent structure is disposed on the member and configured to luminesce in response to excitation by the light source.

According to another aspect of the present invention, a lighting system is disclosed. The lighting system includes a steering wheel having a hub and a rim connected to the hub through a spoke. A light source is disposed on the hub. A member having a first luminescent structure thereon is configured to luminesce in response to excitation by at least a portion of the light source.

According to yet another aspect of the present invention, a lighting system for a vehicle steering assembly is disclosed. The lighting system includes a switch extending from a steering column of a vehicle. A light source is disposed within a vehicle. A first photoluminescent structure is disposed on the switch. The first photoluminescent structure is configured to luminesce in response to excitation by light output from at least a portion of the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
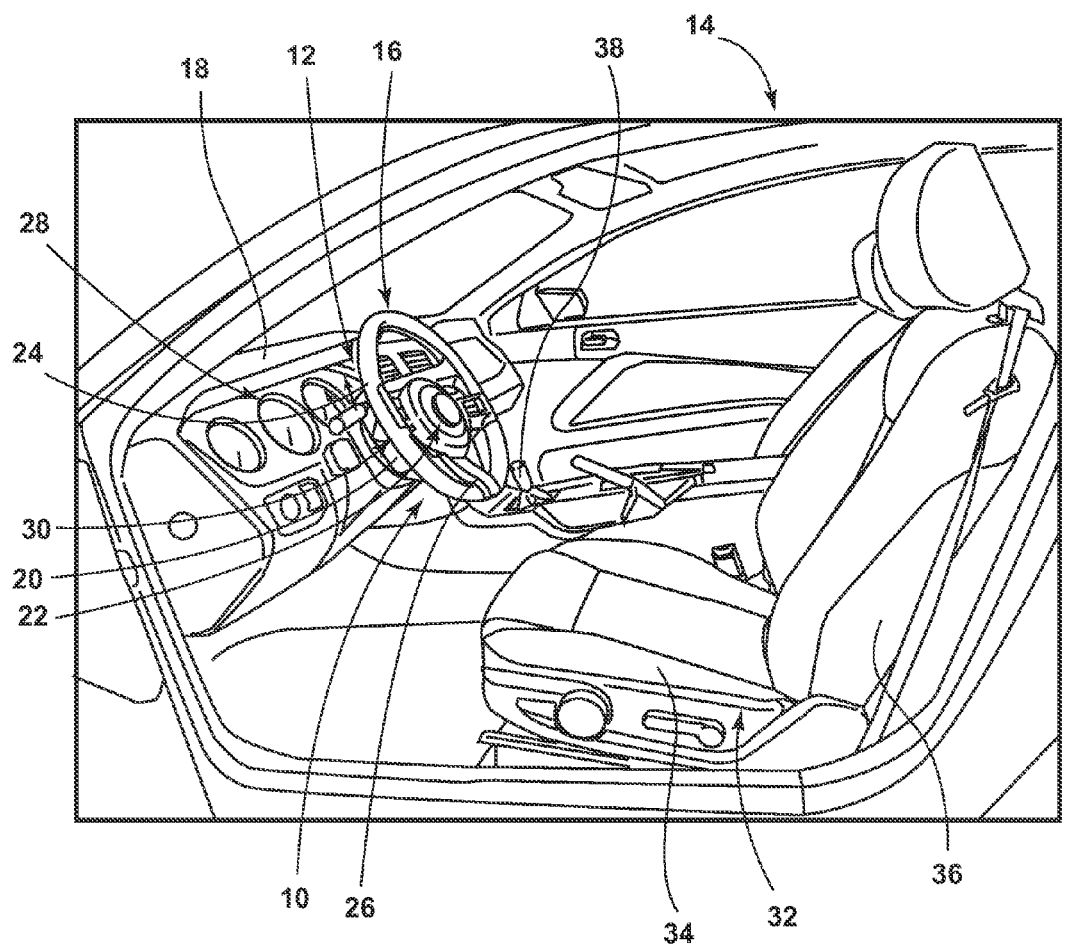
FIG. 1 is a perspective view of a vehicle interior equipped with a lighting system employed on a portion of a steering assembly according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured to illuminate an area proximately located to a vehicle steering assembly. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Referring to FIG. 1, a lighting system 10 is disposed within a steering assembly 12 of a vehicle 14 that is configured to illuminate an area and/or one or more components of the vehicle 14 proximately located to a steering wheel 16, according to one embodiment. The steering assembly 12 is configured to control a steering operation for the vehicle 14. The steering assembly 12 may be mounted through a portion of an instrument panel 18 of a vehicle 14 interior. The steering assembly 12 may include a steering column 20 and a steering wheel 16 connected thereto for rotation in concert with the steering column 20. The steering wheel 16 may include a hub 22 and a rim 24 that is connected to the hub 22 via at least one spoke 26. According to the illustrated embodiment, three spokes 26 are utilized to connect the hub 22 with the rim 24 that are substantially concentrated on the bottom half of the steering wheel 16 to provide adequate viewing of an instrument cluster 28 that is disposed car forward of the steering wheel 16. It is contemplated, however, that any number of spokes 26 may be utilized in any orientation without departing from the concepts of the present disclosure.

When a driver wants to control steering of the road wheels of the vehicle 14, the driver turns the rim 24 of the steering wheel 16. Since the rim 24 is connected to the hub 22 via the spokes 26, rotation of the rim 24 causes rotation of the hub 22 and a shaft 30 disposed within the steering column 20. The shaft 30 is connected to a steering linkage (not shown), which adjusts an angular position of the vehicle wheels in order to control the steering.

The vehicle 14 may further include a seating assembly 32 that includes a seat 34 pivotally coupled with a seatback 36 and a gear shifter 38 that controls the mode of operation of a vehicle transmission. It should be appreciated that the steering assembly 12 described herein may be utilized for any vehicle 14 such as, but not limited to, coupes, sedans, trucks, sport utility, vans, and the like. Further, it should be appreciated that any lighting system 10 found elsewhere on the vehicle 14 may also be manufactured in accordance with the principles of the present disclosure.

Figure 2:
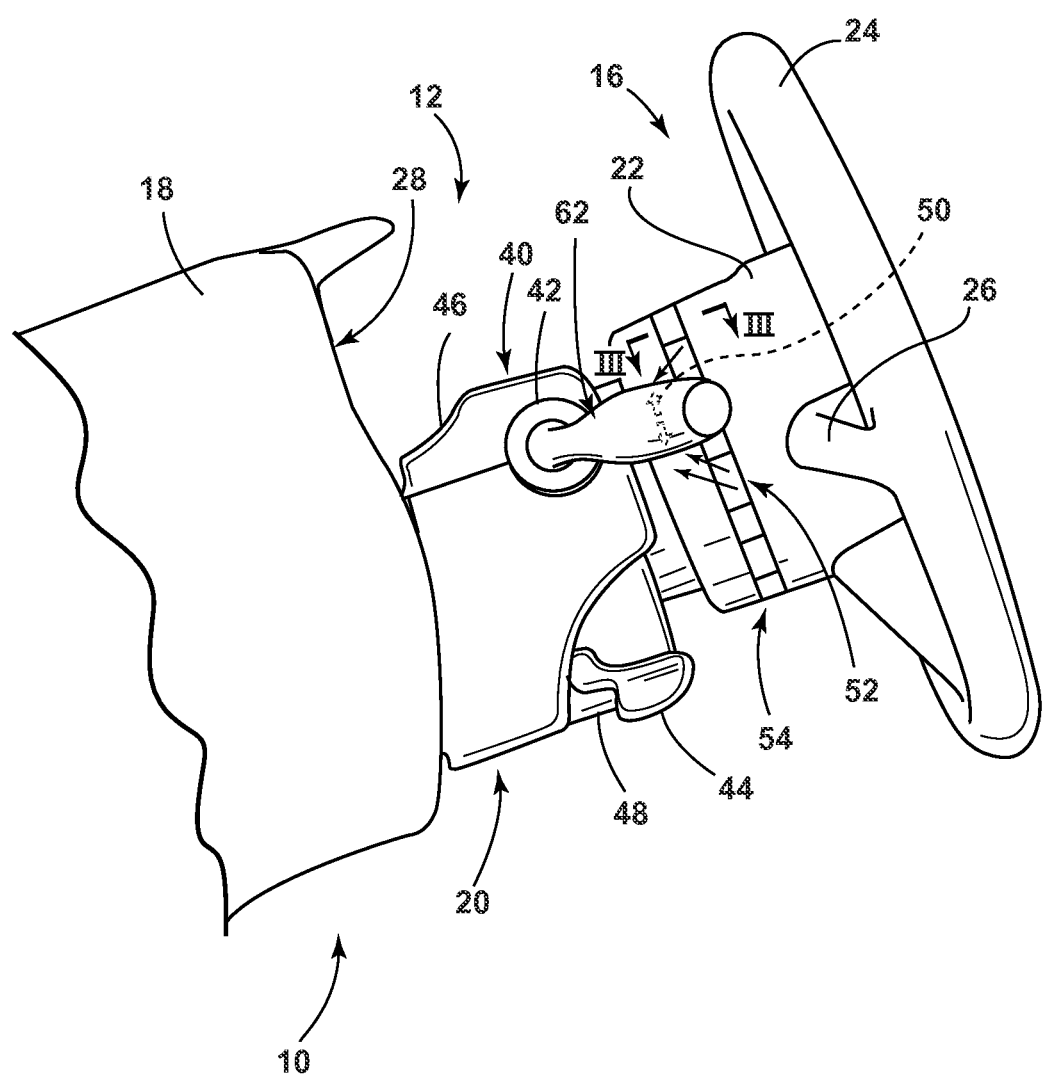
FIG. 2 is a side view of a steering assembly disposed within a vehicle interior employing the lighting system according to one embodiment.

As shown in FIG. 2, the vehicle 14 may include an instrument panel 18, a steering column 20, and a steering column cover assembly 40. The steering column 20 may include a steering wheel 16, steering shaft 30, a member 42, and related wiring. According to one embodiment, the member 42 may be configured as a stalk switch. Steering column stalk switches may operate a function of the vehicle 14, such as a cruise control system, a turn signal, a lighting system(s), and/or a windshield wiping system. The stalk switch generally may be pushed or translated about a portion of the switch to make a contact and initiate one of the vehicle's functions. Or, the stalk switch may require the driver to rotate a portion to make a contact and initiate one of the vehicle's functions. In some instances, the rotational movement sets a variation in a particular function, such as a particular light intensity setting from a plurality of possible intensities for the light or a particular wiper speed setting from a plurality of possible wiper speeds. Additionally, or alternatively, the member 42 may be configured as a device that is mounted to and extends from steering column mounted that is configured to move an automatic transmission through gears. The transmission can be moved among a plurality of different transmission shift positions, such as park, reverse, neutral and drive. It should also be appreciated that the member 42 may be any type of device disposed on or extending from the steering column 20, or a location disposed proximately thereto, without departing from the teachings provided herein.

In addition, the steering column 20 and/or the steering wheel 16 may be adjustably positioned relative to the instrument panel 18 or another portion of the vehicle 14. For example, the steering column 20 or a portion thereof may be tilted, raised, or lowered to position the steering column 20 and/or steering wheel 16 in a desired location. Positioning may be facilitated automatically or by one or more controls, such as an electric switch or a mechanical control 44 that may be actuated to lock or unlock the steering column 20 to permit manual positioning.

The steering column cover assembly 40 may be disposed around at least a portion of the steering column 20. In the embodiment shown in FIG. 2, the steering column cover assembly 40 is generally disposed between the instrument panel 18 and the steering wheel 16. The steering column cover assembly 40 may be configured to conceal one or more gaps between the steering column 20 and the instrument panel 18 and flex to accommodate positioning of the steering column 20.

The steering column cover assembly 40 may have any suitable configuration. In the embodiment shown in FIG. 2, the steering column cover assembly 40 includes an upper housing 46 and a lower housing 48. The upper and lower housings 46, 48 cooperate to define a cavity that receives at least a portion of the steering column 20. The upper and lower housings 46, 48 may include integral flange portions to mate the upper and lower housings 46, 48 to one another.

The upper and lower housings 46, 48 may be made of any suitable material or materials. For example, the upper and lower housings 46, 48 may be made of a polymeric material, such as thermoplastic olefin (TPO) or polypropylene to help reduce undesirable noises like squeaking that may be caused by contact between the steering column cover assembly 40 and the instrument panel 18 and/or steering column 20. Moreover, the upper and lower housings 46, 48 may be fabricated in any suitable manner, such as by a molding process like injection molding.

A member 42 may extend outwardly from the steering column 20. According to one embodiment, the member 42 may be configured as a stalk switch that controls a plurality of vehicle functions. For example, the member 42 may control various vehicle operating circuits and devices, such as a vehicle windshield wipers and washer controls, turn signals, and vehicle headlight switching between low and high beam. Additionally, or alternatively, the member 42 may be utilized for controlling the on, off, set and resume set speed operations of a vehicle cruise control device or any other function an occupant may desire. The member 42 may further include indicia 50 thereon, such as an emblem, logo, or occupant information (e.g., to inform an occupant about the effect of placing the member 42 in a predefined location). The indicia 50 may be disposed on the member 42 through any method known in the art, including, but not limited to, printing, etching, and through any known molding process.

A light source 52 may be disposed on and/or within the steering assembly 12. As illustrated, the light source 52 is disposed forward portion 54 of the steering wheel hub 22 and is oriented to emit light outwardly from the hub 22 to illuminated at least a portion of the member 42. According to one embodiment, the light source 52 includes a flexible circuit board (e.g., a copper flexible circuit) that is coupled to, attached to, or disposed under a portion of the hub 22. In such an arrangement, the flexible circuit board may flex in conjunction with the curvature of the hub 22 to allow the lighting system 10 to be contoured with the steering wheel 16.

According to one embodiment, the light source 52 is configured to fully surround a periphery of a forward portion 54 of the steering wheel hub 22. As will be described in greater detail below, the light source 52 may be configured to include a plurality of portions that may independently illuminate. Accordingly, a portion of the light source 52 may be illuminated at one time. For example, the light source 52 may only illuminate a portion thereof that is orientated toward the member 42 extending outwardly from the steering column cover assembly 40. In such a configuration, portions of the light source 52 may become illuminated as the steering wheel 16 is rotated in order to continually illuminate a predefined location, such as the member 42.

A photoluminescent structure 62 may be applied or otherwise arranged on and/or proximate the light source 52. One or more light sources 52 may be disposed within the lighting system 10 and configured to emit light towards a target location. More specifically, light emitted from the light source 52 towards the target location may be converted by the photoluminescent structure 62 and re-emitted as light having a different wavelength, typically in the visible spectrum. According to the illustrated embodiment, the target location is an area disposed proximate to the member 42. It is contemplated that the lighting system 10 may have a wide range of target locations such that the lighting system 10 may be used for a plurality of functions. Exemplary functions include usage as a welcome/farewell lamp, illumination of a switch 42, ambient lighting, and/or a lamp that provides information about features 148 (FIG. 7) of the vehicle 14 to occupants thereof.

The light source 52 may be over molded, or otherwise attached, to a portion of the steering wheel 16, such as the hub 22 according to one embodiment. According to the embodiment illustrated in FIG. 2, the hub 22 and the light source 52 are placed in a mold simultaneously and an overmold material 66 (FIG. 3A) is disposed over the combination of the hub 22 and the light source 52. In embodiments where the overmold material 66 is cured under pressure, the overmold material 66 may be applied to the hub 22 in a partly-cured condition. In one embodiment the over molding process includes applying the overmold material 66 onto at least a part of the combination of the hub 22 and light source 52 by spraying, brushing, dipping, printing, laminating or rolling, followed by curing the overmold material 66. Such a process results in the hub 22 and light source 52 being coupled to one another. In some embodiments, the overmold material 66 may include a polymeric material, silicon, urethane material, vinyl, and/or any other material that may be advantageous or structurally sound for placement within a zone that regularly comes in contact with occupants of the vehicle 14. Moreover, in some embodiments, the overmold material 66 may be transparent or translucent and may provide light diffusing characteristics. It is also contemplated that in some embodiments, the hub 22 and overmold material 66 may be the same component, or integrally formed with one another. It is contemplated that the light source 52 may be located elsewhere and oriented to illuminate at least a portion of the member 42.

Figure 3A:
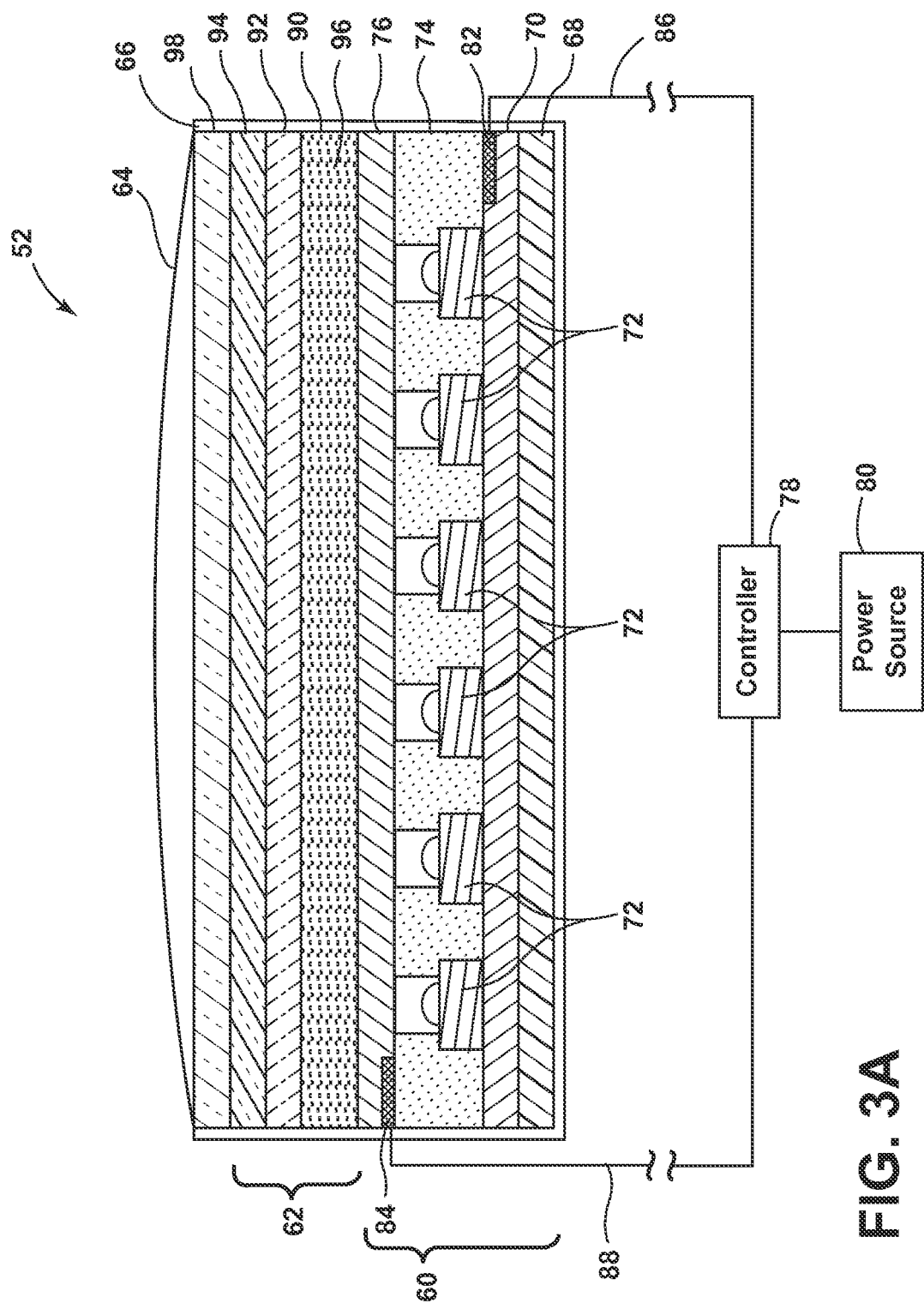
FIG. 3A is a cross-sectional view taken along line III-III of FIG. 2 illustrating a light source according to one embodiment.

Referring to FIGS. 3A-3E, a cross-sectional view of the light source 52 capable of use on a vehicle 14 with an external photoluminescent structure 62 is shown according to one embodiment. As illustrated in FIG. 3A, the light source 52 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a base member 68 as its lowermost layer. The base member 68 may include a polycarbonate, poly-methyl methacrylate (PMMA), or polyethylene terephthalate (PET) material, or any other material known in the art, on the order of 0.005 to 0.060 inches thick and is arranged over the intended vehicle 14 surface on which the light source 52 is to be received (e.g., hub 22). Alternatively, as a cost saving measure, the base member 68 may directly correspond to a preexisting vehicle 14 structure (e.g., hub 22, exterior panels, and/or interior panels).

The light-producing assembly 60 includes a positive electrode 70 arranged over the base member 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit inputted light 100 (FIG. 3B) towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired base member 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light 100 (FIG. 3B) of a specific wavelength from at least a portion of the LED sources 72 of the light-producing assembly 60. As a result, the inputted light 100 undergoes an energy conversion process and is re-emitted at a different wavelength. According to one embodiment, the photoluminescent material 96 may be formulated to convert inputted light 100 into a longer wavelength light, otherwise known as down conversion. Alternatively, the photoluminescent material 96 may be formulated to convert inputted light 100 into a shorter wavelength light, otherwise known as up conversion. Under either approach, light converted by the photoluminescent material 96 may be immediately outputted 102 (FIG. 3B) from the photoluminescent structure 62 or otherwise used in an energy cascade, wherein the converted light serves as inputted light to excite another formulation of photoluminescent material 96 located within the energy conversion layer 90, whereby the subsequent converted light may then be outputted from the photoluminescent structure 62 or used as inputted light, and so on. With respect to the energy conversion processes described herein, the difference in wavelength between the inputted light 100 and the converted outputted light 102 is known as the Stokes shift and serves as the principle driving mechanism for an energy conversion process corresponding to a change in wavelength of light.

With continued reference to FIG. 3A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 52 into small package spaces of the vehicle 14.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 52. For example, the decorative layer 98 may be configured to confer a grained appearance to the viewable portion 64 when the viewable portion 64 is in an unilluminated state. In other embodiments, the decorative layer 98 may be tinted any color to complement the vehicle 14 structure on which the light source 52 is to be received. For example, the decorative layer 98 may be similar in color to that of the hub 22 so that the lighting system 10 is substantially hidden when in the unilluminated state. Alternatively, the decorative layer 98 may provide indicia 50 and/or an emblem such that the decorative layer 98 and the indicia 50 may be backlit and/or otherwise illuminated by the light-producing assembly 60. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62 and may be formed integrally with the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive contact that may occur when the occupants utilize the steering assembly 12 employing the lighting system 10 described herein.

In some embodiments, the photoluminescent structure 62 may be employed separate and away from the light-producing assembly 60. For example, the photoluminescent structure 62 may be positioned on a vehicle 14 component or surface proximate, but not in physical contact, with the light-producing assembly 60, as will be described in more detail below. It should be understood that in embodiments where the photoluminescent structure 62 is incorporated into distinct components separated from the light source 52, the light source 52 may still have the same or similar structure to the light source 52 described in reference to FIG. 3A.

Figure 3B:
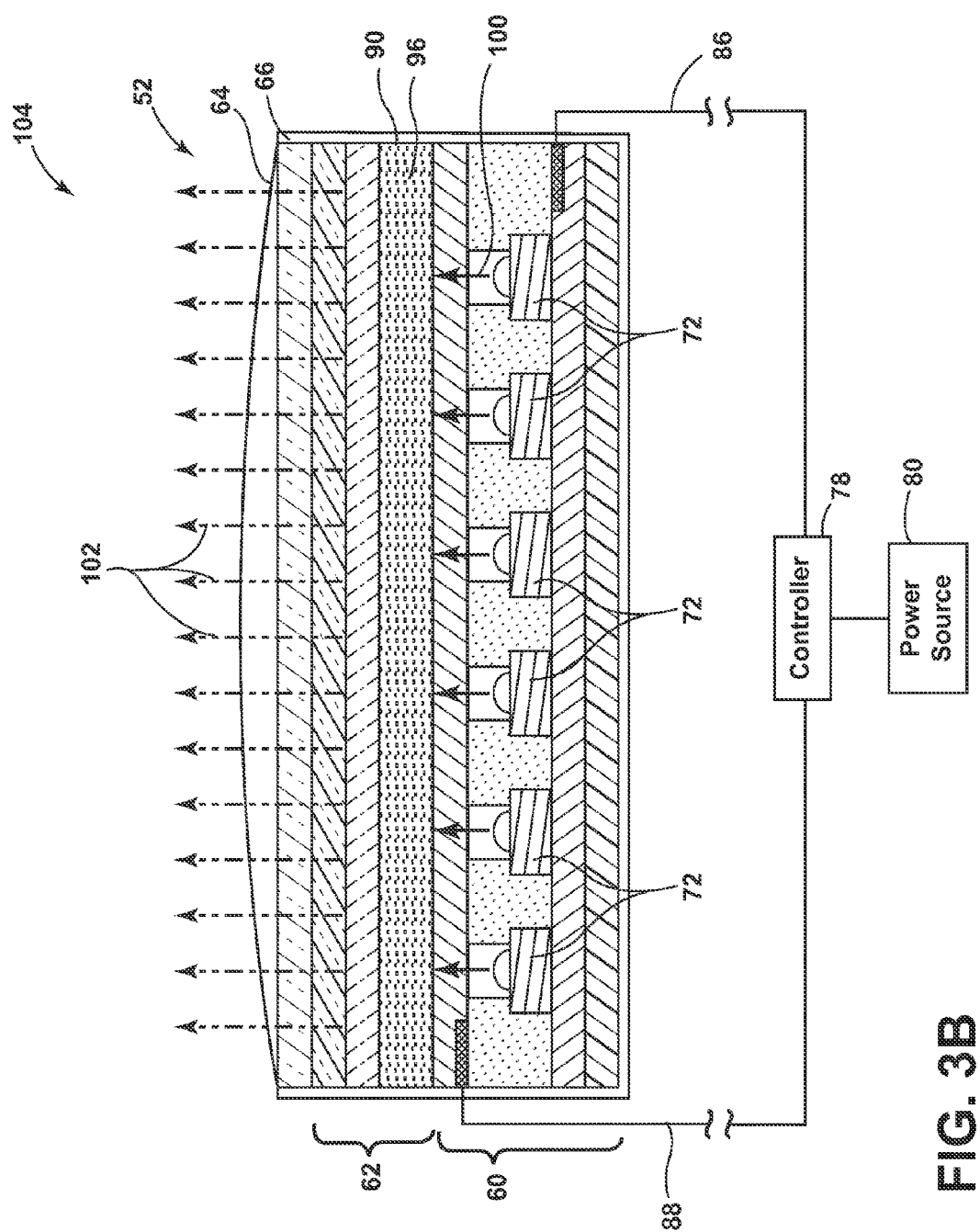
FIG. 3B is a cross-sectional view taken along line III-III of FIG. 2 further illustrating the light source, according to one embodiment.

Referring to FIG. 3B, an energy conversion process 104 for producing single color luminescence is illustrated according to one embodiment. For purposes of illustration, the energy conversion process 104 is described below using the light source 52 depicted in FIG. 3A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application. The converted visible outputted light 102 is outputted from the light source 52 via the viewable portion 64, thereby causing the viewable portion 64 to illuminate in the desired color. In one embodiment, the energy conversion process 104 is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Figure 3C:
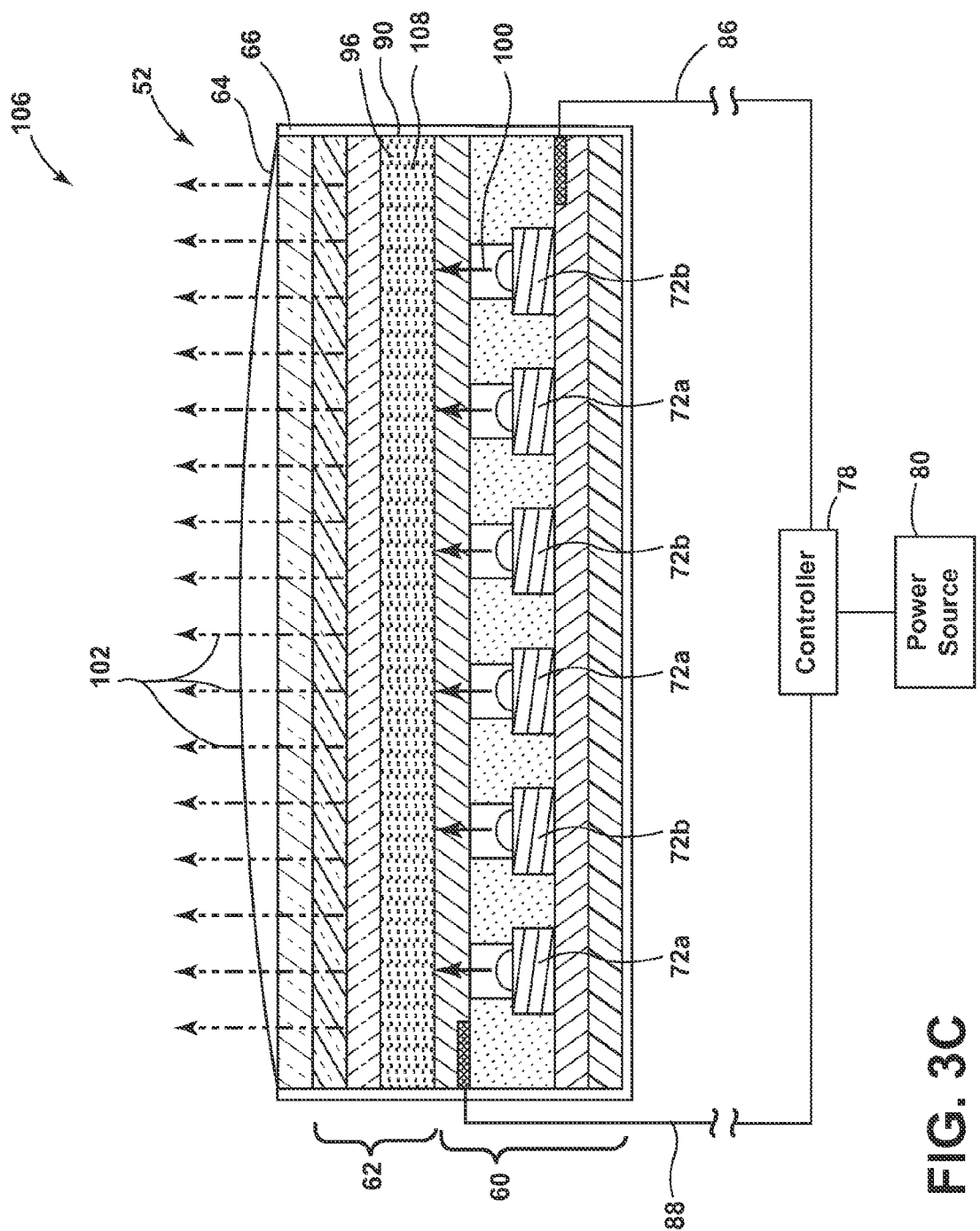
FIG. 3C is a cross-sectional view taken along line III-III of FIG. 2 illustrating an alternate light source, according to one embodiment.

Referring to FIG. 3C, a second energy conversion process 106 for generating multiple colors of light is illustrated according to one embodiment. For consistency, the second energy conversion process 106 is also described below using the light source 52 depicted in FIG. 3A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the concepts provided herein similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted outputted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light outputted 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible outputted light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each led source 72a, 72b may also be proportionally varied to one another such that additional colors may be obtained. For energy conversion layers 90 containing more than two distinct photoluminescent materials 96, 108, a greater diversity of colors may be achieved. Contemplated colors include red, green, blue, and combinations thereof, including white, all of which may be achieved by selecting the appropriate photoluminescent materials and correctly manipulating their corresponding LED sources 72a, 72b.

Figure 3D:
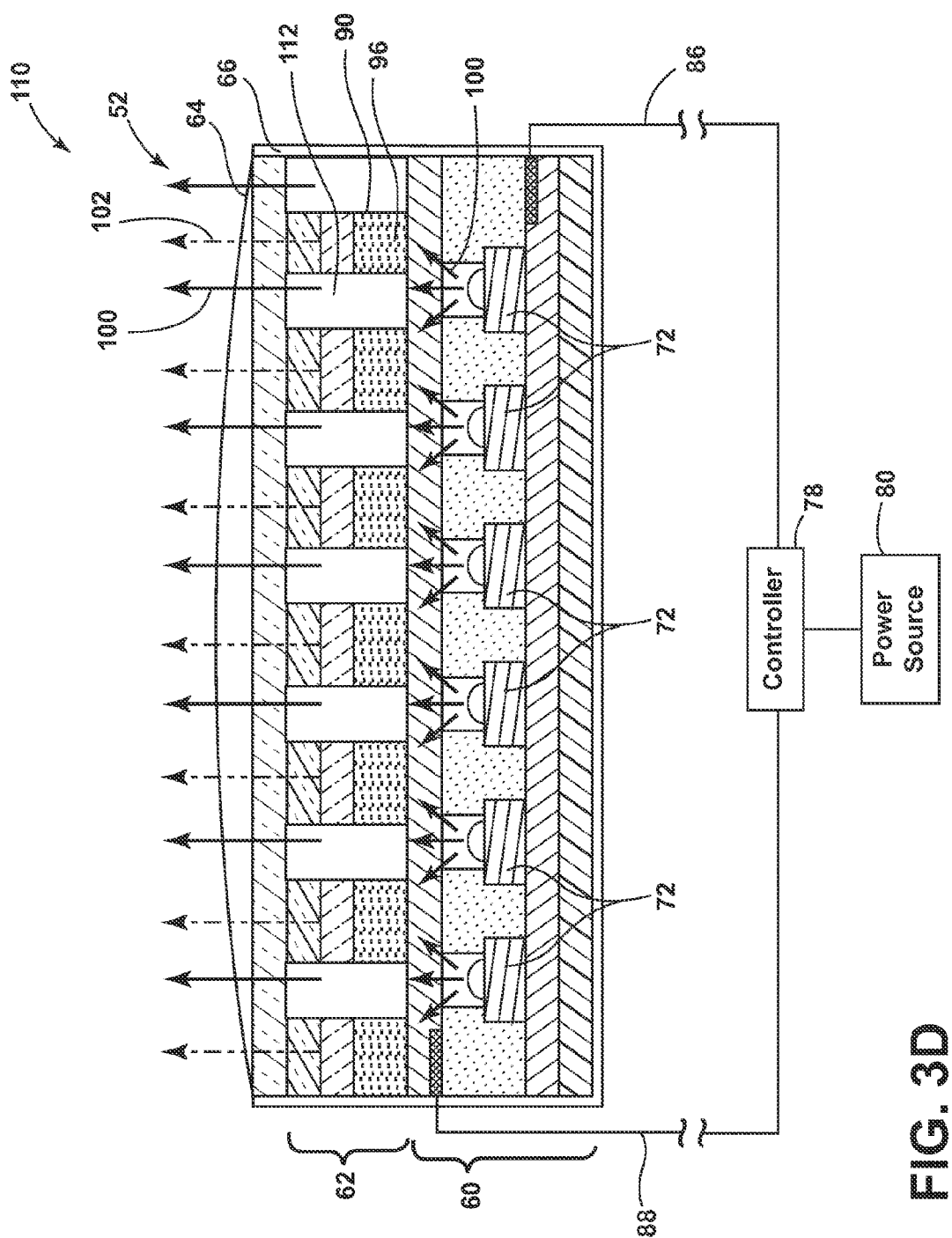
FIG. 3D is a cross-sectional view taken along line III-III of FIG. 2 illustrating a light source having a luminescent structure separated by light transmissive portions disposed on the light source, according to one embodiment.

Referring to FIG. 3D, a third energy conversion process 110 includes a light-producing assembly 60, such as the one described in reference to FIG. 3A, and a photoluminescent structure 62 disposed thereon is illustrated, according to an alternate embodiment. The photoluminescent structure 62 is configured to convert inputted light 100 received from LED sources 72 into a visible outputted light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The inputted light 100 emitted through the light transmissive portions 112 may be directed from the light-producing assembly 60 towards a second photoluminescent structure 132 (FIG. 7) disposed proximate to the light-producing assembly 60. The second photoluminescent structure 132 may be configured to luminesce in response to the inputted light 100 that is directed through the light transmissive portions 112.

Figure 3E:
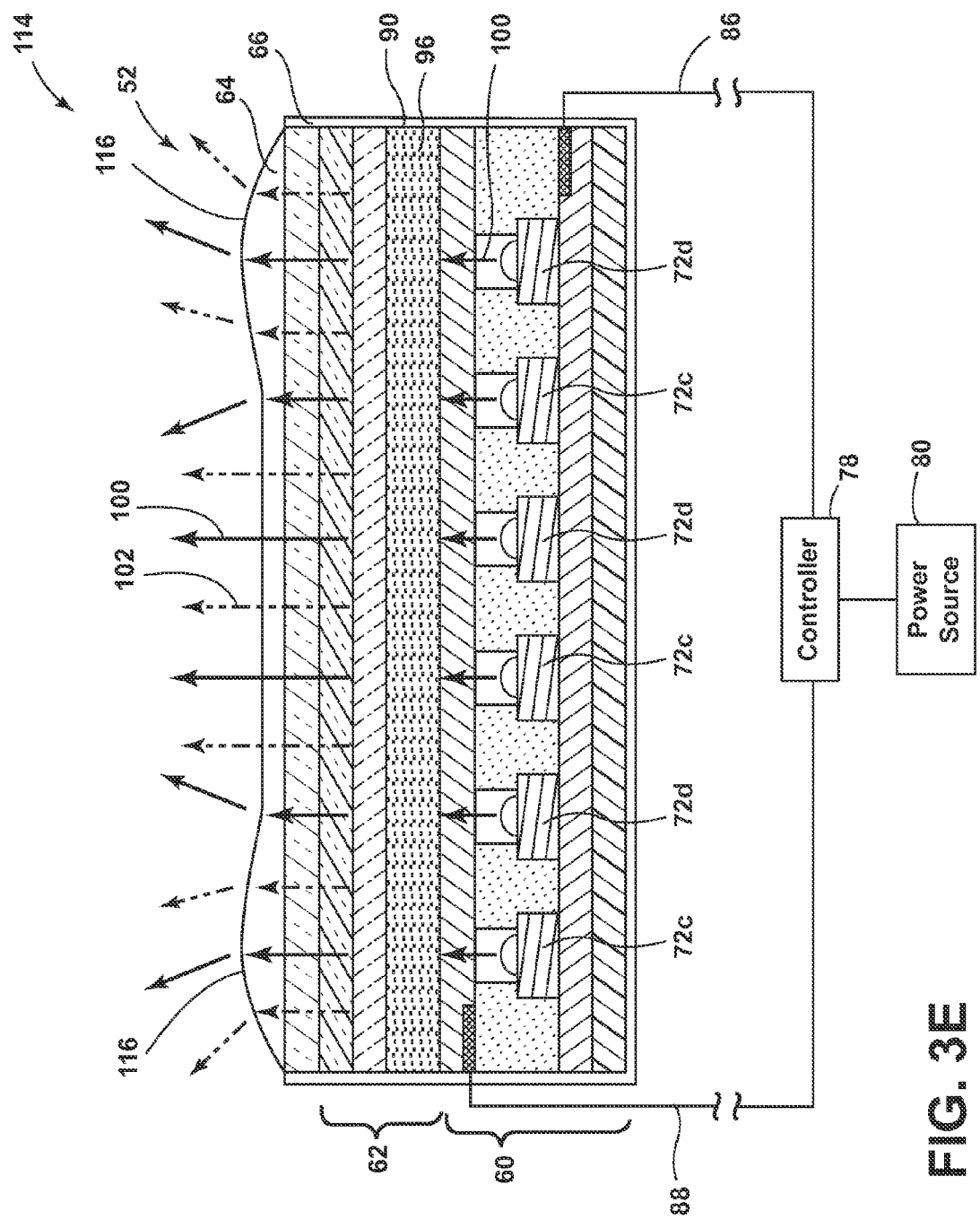
FIG. 3E is a cross-sectional view taken along line III-III of FIG. 2 illustrating an alternate light source having a luminescent structure disposed on the light source configured to convert a portion of light emitted from the light source from a first wavelength to a second wavelength, according to one embodiment.

Referring to FIG. 3E, a fourth energy conversion process 114 for generating multiple colors of light utilizing the light-producing assembly 60, such as the one described in reference to FIG. 3A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 52 is not converted by the photoluminescent structure 62). The intensity of the emitted inputted light 100 may be modified by pulse-width modulation or current control to vary the amount of inputted light 100 emitted from the LED sources 72 that passes through the photoluminescent structure 62 without converting to a second, outputted 102 wavelength. For example, if the light source 52 is configured to emit inputted light 100 at a low level, substantially all of the inputted light 100 may be converted to the second wavelength of outputted light 102. In this configuration, a color of outputted light 102 corresponding to the photoluminescent structure 62 may be emitted from the light-producing assembly 60. If the light source 52 is configured to emit inputted light 100 at a high level, only a portion of the first wavelength may be converted by the photoluminescent structure 62. In this configuration, a first portion of the inputted light 100 may be converted by the photoluminescent structure 62 and a second portion of the inputted light 100 may be emitted from the light-producing assembly 60 at the first wavelength towards additional photoluminescent structures 132 disposed proximately to the light source 52. The additional photoluminescent structures 132 may luminesce in response to the inputted light 100 emitted from the light source 52.

According to one exemplary embodiment, a first portion of the LED sources 72, exemplarily shown as LED sources 72c is configured to emit an inputted light 100 having a wavelength that excites the photoluminescent material 96 within the photoluminescent structure 62 and results in the inputted light 100 being converted into a visible outputted light 102 of a first color (e.g., white). Likewise, a second portion of the LED sources 72, exemplarily shown as LED sources 72d, is configured to emit an inputted light 100 having a wavelength that passes through the photoluminescent structure 62 and excites additional photoluminescent structures 132 disposed proximately to the lighting system 10 thereby illuminating in a second color. The first and second colors may be visually distinguishable from one another. In this manner, LED sources 72c and 72d may be selectively activated using the controller 78 to cause the lighting system 10 to luminesce in a variety of colors.

The light-producing assembly 60 may also include optics 116 that are configured to direct inputted light 100 emitted from the LED sources 72c, 72d and the outputted light 102 emitted from the photoluminescent structure 62 towards pre-defined locations. For example, the inputted light 100 emitted from the LED sources 72c, 72d and the photoluminescent structure 62 may be directed and/or focused towards a desired feature 148 (FIG. 7) and/or location proximate to the light source 52.

Figure 4:
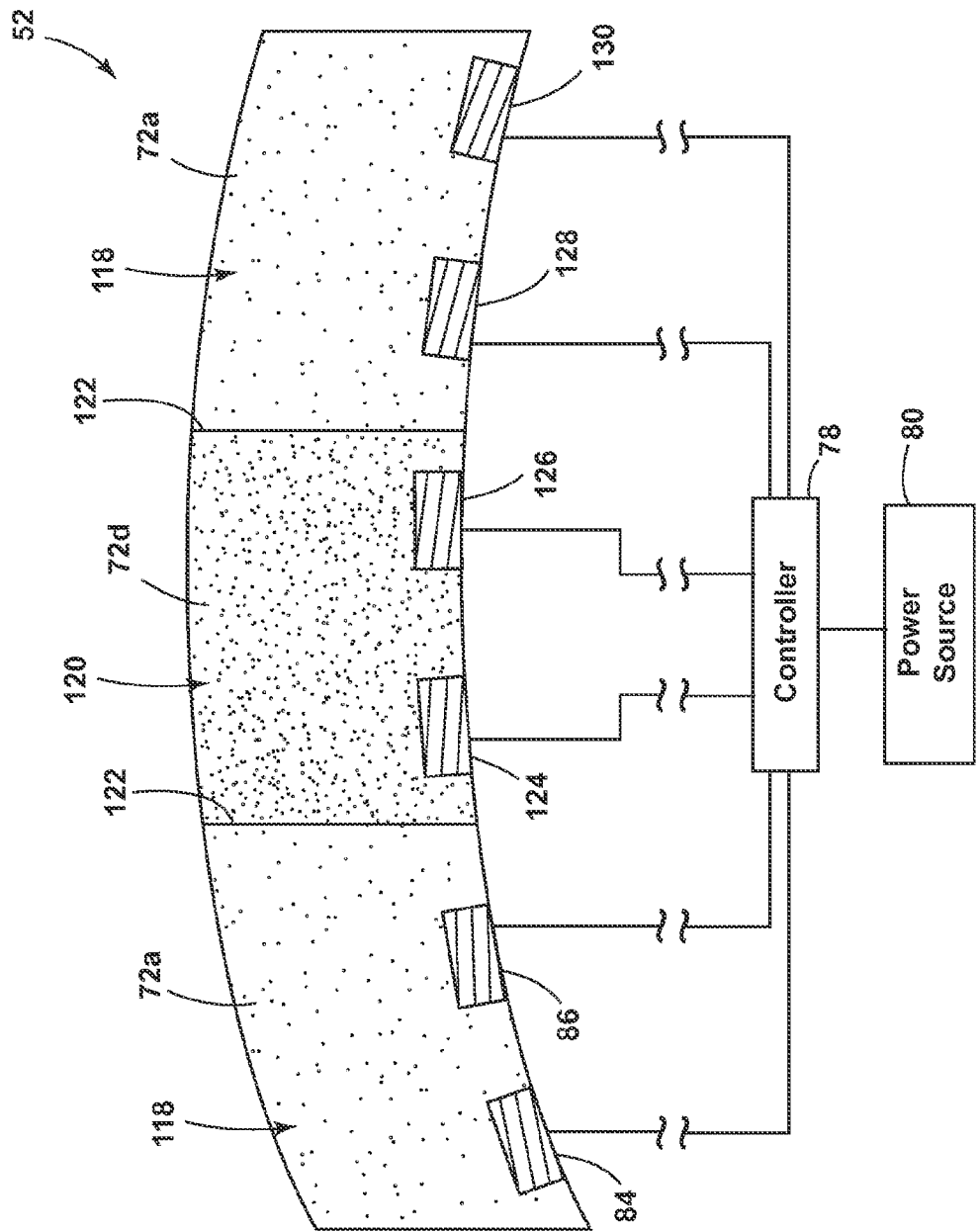
FIG. 4 illustrates a top view of a light-producing assembly, according to one embodiment, having varying types and concentrations of LED sources transversely along the light-producing assembly.

Referring to FIG. 4, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120. It should be appreciated that the bus bars 82, 84, 124, 126, 128, 130 may be coupled to each portion 118, 120 of the light-producing assembly 60 on opposing sides in alternate embodiments, as described above.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 52. For example, a central portion 120 of the light-producing assembly 60 may have a greater density of LED sources 72 than peripheral portions 118, or vice versa. In such embodiments, the light source 52 may appear brighter or have a greater luminance in order to preferentially illuminate pre-defined locations. In other embodiments, the density of LED sources 72a, 72d may increase or decrease with increasing distance from a preselected point (e.g., a specific portion of the light source 52).

Figure 5:
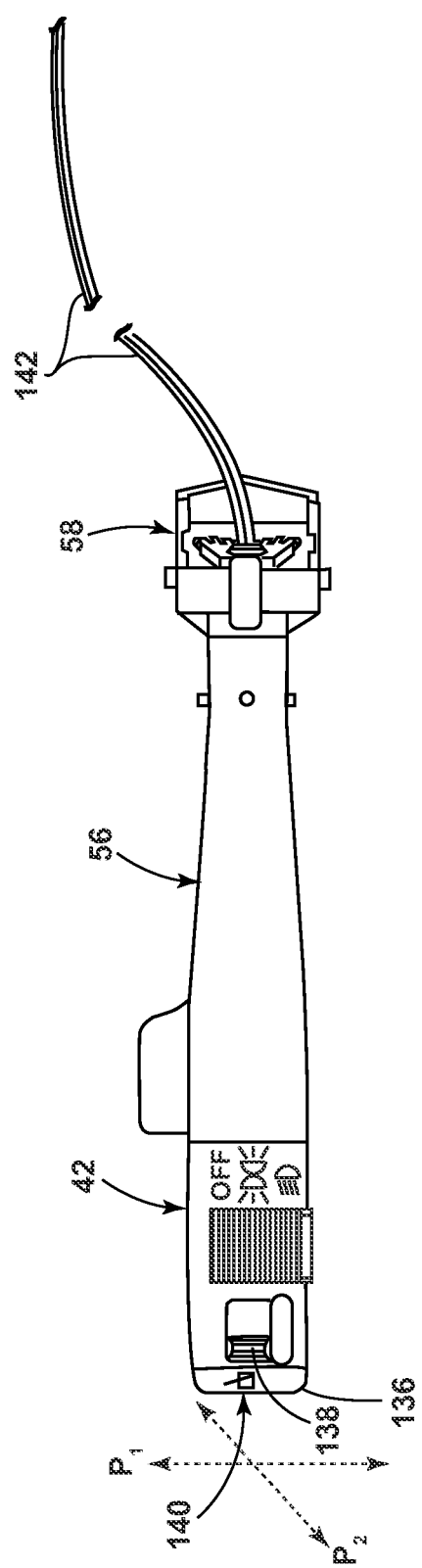
FIG. 5 illustrates a perspective view of a member that may be utilized as a component of the lighting system.

Referring to FIG. 5, the member 42 includes a single lever 56 pivotally mounted on one side of the housing attached to the steering column 20 in an easily accessible position for the driver of the vehicle 14. The lever is gimballed at one end portion 58 in the housing so as to move in a plurality of mutually separate planes P1, P2. Further, the lever may be provided with a rotatable end cap 136 as well as a slidable member 138 movable along the longitudinal axis of the lever. Actuators are mounted in the housing and, in response to movement of the lever in one direction, i.e., such as in one of the plurality of mutually separate planes, or rotation of the end cap 136, move a switching member carrying contacts between various switching positions to effect the switching of electrical connections 142 for a particular vehicle operating circuit. Any suitable material can be used to form any portion of the member 42, including, but not limited to, a polymeric material.

In a typical application, pivotal movement of the lever in a substantially vertical plane P1 about its gimballed connection to the housing controls the vehicle turn signals, and pivotal movement of the lever in a substantially horizontal plane P2 controls the switching of the vehicle headlights between low beam, high beam and, optionally, flash-to-pass. Rotation of the end cap 136 is used to control the operation of the vehicle windshield wiper system between on and off states and, optionally, a plurality of intermittent distinct speeds.

In vehicles employing an automatic cruise control, a slide switch or member 138 may be mounted on the member 42 and is selectively movable between various positions including off, on, and a momentary resume set speed position. A spring-biased button 140 may be movably mounted in the end of the end cap 136 and is employed to set a desired speed for the cruise control device. Movement of the slide member 138 and/or the button 140 between various positions cause electrical contacts mounted within the lever to close various circuits of the cruise control device depending upon the specific position of the slide member 138 and the set speed button. It should be appreciated, however, that any other vehicle control may be disposed on the member 42. Further, it should also be appreciated that any number of switches may be disposed within the steering assembly 12 of the vehicle 14 and made in accordance with the present disclosure without departing from the teachings provided herein.

Figure 6:
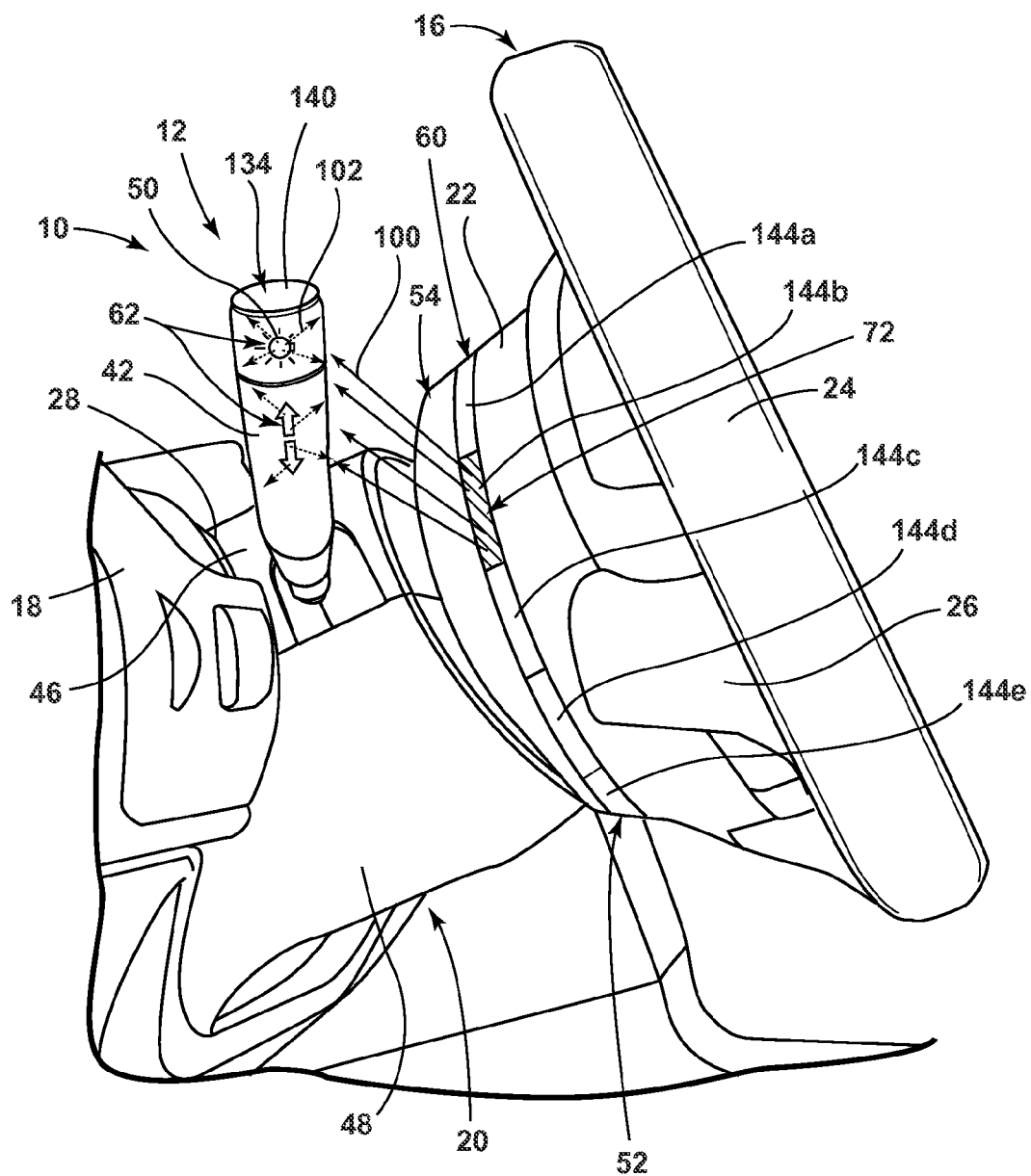
FIG. 6 is a side view of a vehicle steering assembly employing the lighting system, according to one embodiment.

Referring to FIG. 6, the lighting system 10 is configured to attach to the hub 22 of the steering wheel 16, according to one embodiment. As illustrated, the light-producing assembly 60 emits a substantial portion of the inputted light 100 and outputted light 102 in an outward direction from the hub 22. However, it is contemplated that the inputted light 100 may be directed in any desired direction within the vehicle 14 depending on the structure and packaging of the steering assembly 12. For example, the inputted light 100 and outputted light 102 may be emitted in a car forward orientation in some embodiments.

A photoluminescent structure 62 is operatively coupled with the light source 52. For example, according to one embodiment, the light source 52 may be disposed on a forward portion 54 of the hub 22. A photoluminescent structure 62 may be disposed within and/or form indicia 50 that is disposed on the member 42 and operatively coupled to the light source 52. As a result, the indicia 50 containing the photoluminescent structure 62 may be excited by the light source 52 and emit converted, outputted light 102 thereby illuminating a vehicle feature that is traditionally difficult to illuminate.

The lighting system 10 may further include a user interface 134 disposed proximately to the lighting system 10, or any other desired location within a vehicle 14. The user interface 134 may be configured such that a user may control the wavelength of light that is emitted by the LED sources 72 that are illuminated. Alternatively, the user interface 134 may be used to switch the lighting system 10 through a plurality of modes and/or functions. The user interface 134 may use any type of control known in the art to control the light source 52, such as, but not limited to, switches (e.g., push-type buttons 140, proximity sensors, etc.) and may be disposed in any practicable location. For example, the user interface 134 may be configured as a pushbutton 140 disposed on one end of the member 42.

Still referring to FIG. 6, the light-producing assembly 60 is illustrated having five portions 144a, 144b, 144c, 144d, 144e. Each portion 144a, 144b, 144c, 144d, 144e may illuminate individually and in a plurality of colors and intensities, as described herein. As described above, the portion of the light source 52 that is optically coupled with the member 42 may emit light towards indicia 50 disposed thereon. Accordingly, each portion 144a, 144b, 144c, 144d, 144e may illuminate sequentially as the steering wheel 16 is rotated. Each portion 144a, 144b, 144c, 144d, 144e may return to an unilluminated state when the specific portion is no longer optically coupled with a desired feature 148, such as the member 42. It should be appreciated that the above described example is not limiting and that any desired illumination pattern may be used for a plurality of vehicle-related conditions without departing from the concepts provided herein.

In an alternate embodiment, a first member 42 extends from a first side of the steering column 20 and a second member 42 extends from the opposing side of the steering column 20. The first and second members 42 may both have photoluminescent structures 62 thereon that are configured to emit outputted light 102 when inputted light 100 is directed at each respective portion. In such a configuration, the light-producing assembly 60 may illuminate two independent portions thereby exciting each photoluminescent structure 62 simultaneously.

In some embodiments, some or all portions of the light-producing assembly 60 may also be illuminated when the vehicle 14 senses an issue with some portion of the vehicle 14. For example, once the amount of fuel disposed within the vehicle 14 is depleted past a pre-defined portion, a portion of the light-producing assembly 60 may flash so that an occupant may recognize an action is necessary. Exemplary issues that may initiate the warning indicator include low tire pressure, low oil pressure, low battery power, and/or any other system malfunction onboard the vehicle 14.

According to an alternate embodiment, the vehicle 14 may be equipped with a heated and/or cooled steering wheel 16, as known in the art. The lighting system 10 may be configured to back-light the steering wheel 16 in a first color (e.g., blue) when the steering wheel 16 is cooled. Similarly, the steering wheel 16 may be configured to illuminate in a second color (e.g., red) when the steering wheel 16 is heated.

As illustrated in FIG. 6, the light-producing assembly 60 may be attached, coupled, and/or over molded to a top surface of the hub 22. Thus, the light-producing assembly 60 may be flushly mounted to the top surface of the hub 22 thereby partially concealing from the view of occupants in the unilluminated state. According to one embodiment, the lighting system 10 and/or one or more components thereof have a soft conformable encapsulation to both protect the lighting system 10 and to limit flexing of portions of the lighting system 10. Exemplary materials that may be utilized include, but are not limited to, polyvinyl chloride, vulcanized thermoplastic elastomer, and polyester elastomer.

Figure 7:
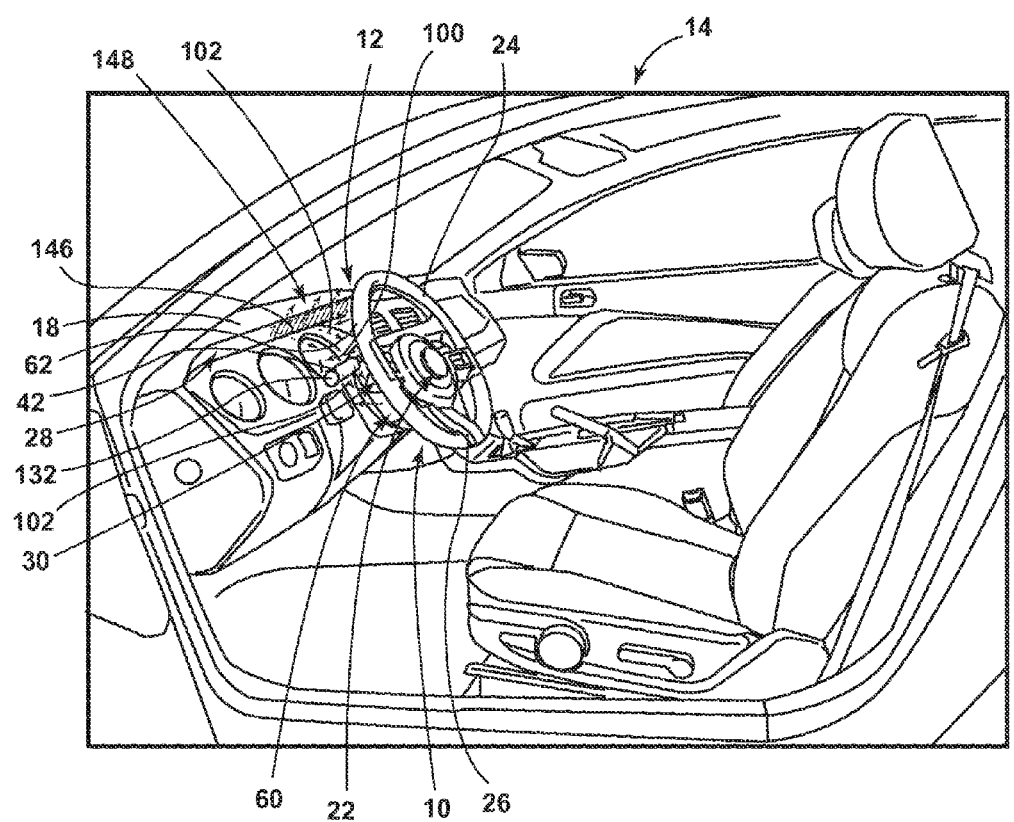
FIG. 7 illustrates an exemplary side view of a vehicle interior employing the lighting system and a second luminescent structure on a feature of the vehicle.

Referring to FIG. 7, a first photoluminescent structure 62 is disposed on the light-producing assembly 60, a second photoluminescent structure 132 is disposed on the member 42, and a third photoluminescent structure 146 is disposed on a feature 148 of the vehicle 14, such as a portion of the instrument cluster 28 and/or instrument panel 18. As described above, the portion of the light-producing assembly 60 having the photoluminescent structure 62 thereon converts inputted light 100 to outputted light 102 of a different wavelength. A second portion of the light-producing assembly 60 emits inputted light 100 that is then converted by the second photoluminescent structure 132 on the member 42 thereby illuminating a portion thereof and/or indicia 50 disposed thereon at a wavelength that may be different than that emitted from the first photoluminescent structure 62. A third photoluminescent structure 146 is disposed on the instrument cluster 28 and is configured to emit outputted light 102 of a respective, unique wavelength. The outputted light 102 may be used as illumination of indicia 50 disposed within the vehicle 14, welcome/farewell sequence light, ambient light, to illuminate any interior feature 148 of the vehicle 14, and/or a warning indicator.

Still referring to FIG. 7, two light-producing assemblies 60 may be disposed on within the lighting system 10 to emit light in a vehicle forward direction. The first light-producing assembly 60 may be disposed on a vehicle forward portion of the steering wheel rim and may have the photoluminescent structure 62 thereon for emitting outputted light 102 towards the instrument cluster 28, the instrument panel 18, or any other feature 148 forward of a vehicle occupant. The second light-producing assembly 60 may be disposed on the hub 22. A first portion of light emitted from the second light-producing assembly 60 may be converted by a photoluminescent structure 62 thereon thereby providing ambient light and/or backlighting the steering wheel 16. A second portion of light emitted from the second light-producing assembly 60 may be directed towards the member 42 having a photoluminescent structure 62 thereon, as described herein. The photoluminescent structure 62 may illuminate in response to inputted light 100 emitted from either light-producing assembly 60 in response to pre-defined conditions.

It is contemplated that the use of additional photoluminescent structures 132 proximate the lighting system 10 may be disposed at any desired location and is not limited to the instrument cluster 28. For example, an additional photoluminescent structure 132 may be disposed on the instrument panel 18. Additionally, the second photoluminescent structure 132 may also provide safety benefits, such as notifying an incoming occupant of specific features 148 within the vehicle 14.

According to an alternate embodiment, the light source 52 may be disposed on any component within the vehicle 14 that is disposed proximately to the member 42, such as the instrument panel 18 or the instrument cluster 28. The light source 52 may be stationary or placed on a movable component and configured in accordance with the teachings provided herein such that the light source 52 may maintain an optically coupling with the photoluminescent structure 62. A second photoluminescent structure 132 may be disposed on the light source 52 or on any additional feature 148 that may also be optically coupled with the light source 52.

Figure 8:
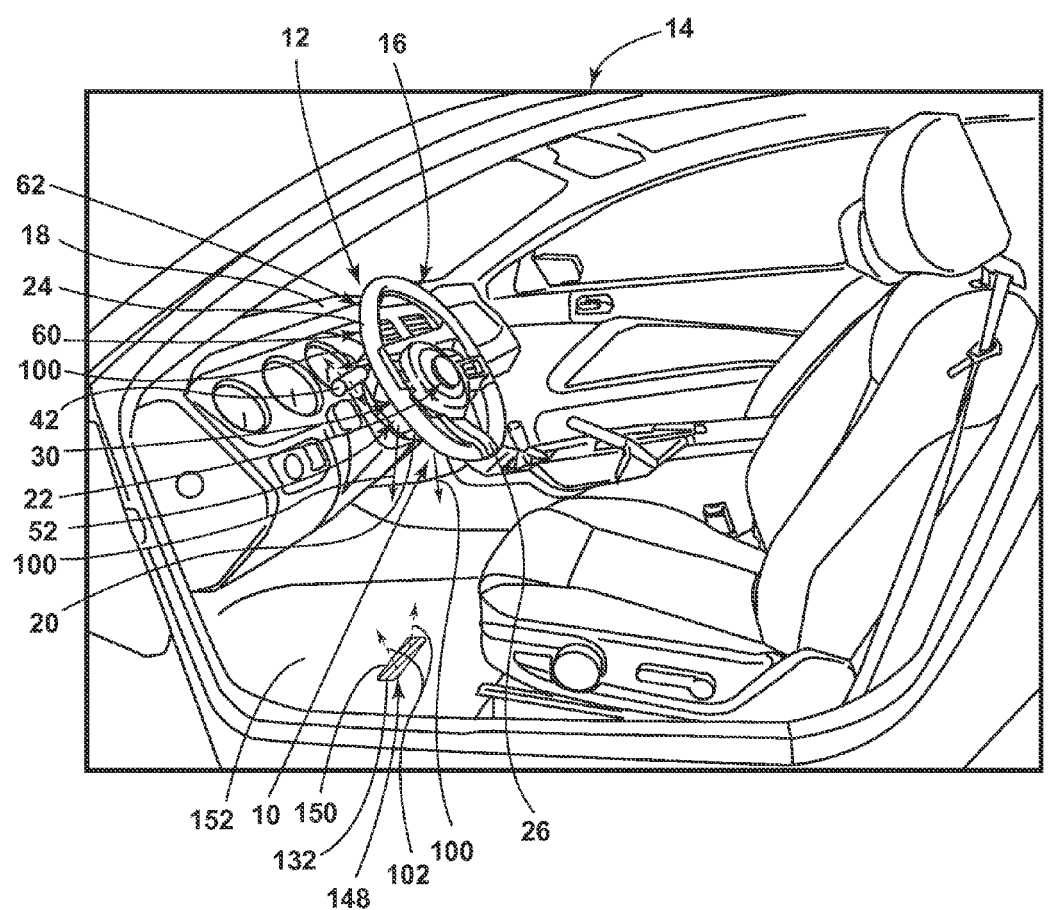
FIG. 8 illustrates an exemplary perspective view of a vehicle interior employing the lighting system with a photoluminescent structure disposed in a component that is separated from the steering assembly, according to another embodiment.

Referring to FIG. 8, an alternate embodiment of the lighting system 10 is illustrated. As illustrated, the first photoluminescent structure 62 is disposed on the member 42. The inputted light 100 emitted from the light source 52 may be of a first wavelength that is configured to excite the first photoluminescent structure 62 on the member 42. In response, the first photoluminescent structure 62 may illuminate at a second wavelength of outputted light 102 thereby illuminating pre-defined portions of the member 42.

A second photoluminescent structure 132 may be disposed on a location that is separated from the steering assembly 12. For example, a second photoluminescent structure 132 may be disposed on a vehicle floor 152 that is configured to convert inputted light 100 to outputted light 102 of a different wavelength thereby illuminating a feature 148 and/or indicia 50 disposed thereon. As described above, a first portion of the light-producing assembly 60 disposed on the hub 22 may be illuminated and directed towards the member 42 while a second portion of the light-producing assembly is simultaneously directed towards the second photoluminescent structure 132. Alternatively, the second portion of the light-producing assembly 60 may excite the second photoluminescent structure 132 while the vehicle 14 is in a first state (e.g., when a vehicle door is opened and for a predefined amount of time thereafter) and the first portion of the light-producing assembly 60 may be illuminated when the vehicle 14 is in a second state (e.g., when the vehicle engine is placed in the running state).

Figure 9:
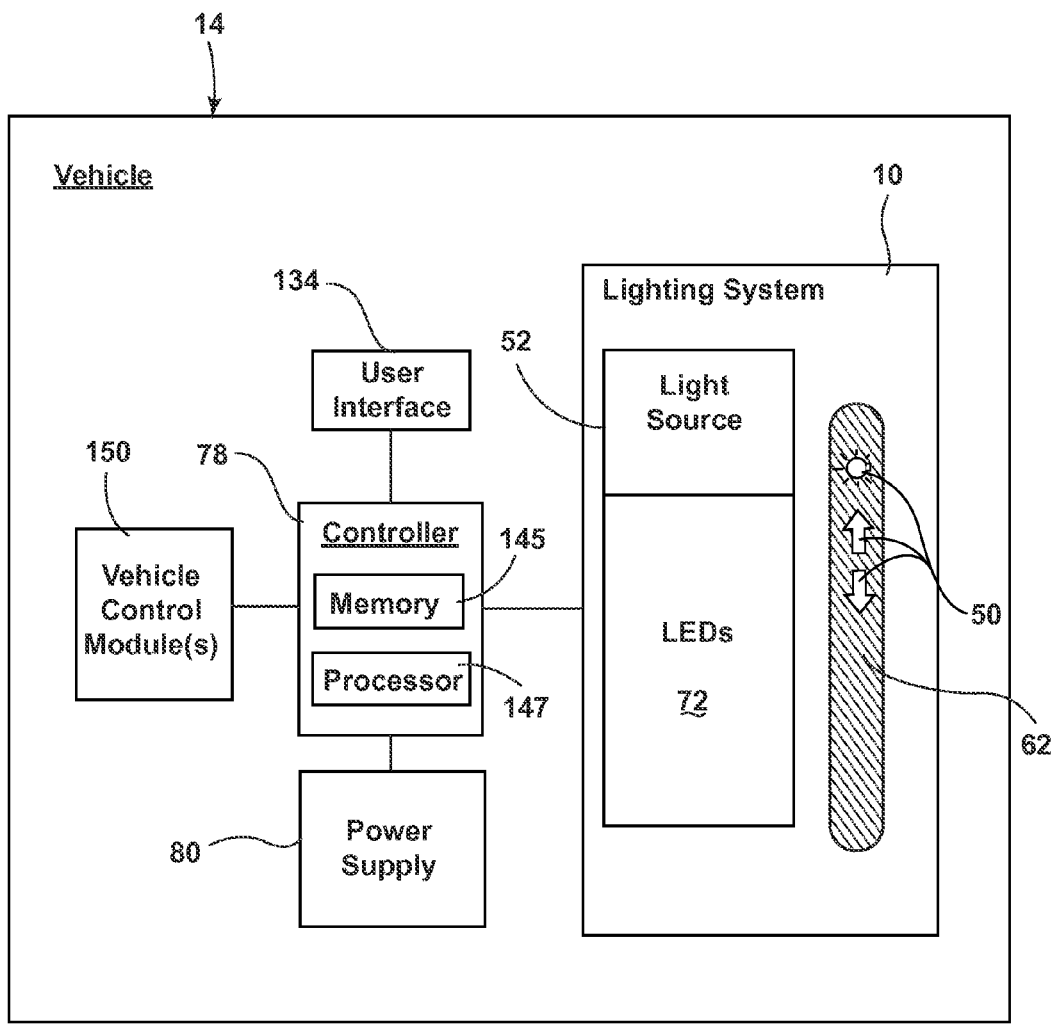
FIG. 9 is a block diagram of the vehicle and the lighting system.

Referring to FIG. 9, a block diagram of a vehicle 14 is generally shown in which the lighting system 10 is implemented. The lighting system 10 includes a controller 78 in communication with the light source 52. The controller 78 may include memory 145 having instructions contained therein that are executed by a processor 147 of the controller 78. The controller 78 may provide electrical power to the light source 52, or to a respective bus bar 82, 84, via a power source 80 located onboard the vehicle 14. In addition, the controller 78 may be configured to control the inputted light 100 emitted from each light source 52 based on feedback received from one or more vehicle control modules 150 such as, but not limited to, a body control module, engine control module, steering control module, brake control module, the like, or a combination thereof. By controlling the inputted light 100 emitted from the light source 52, the lighting system 10 may illuminate in a variety of colors and/or patterns to provide an aesthetic appearance, or may provide vehicle information to an intended observer. For example, when the lighting system 10 is illuminated, the lighting system 10 may illuminate indicia 50 disposed on a switch 42 within the vehicle 14.

In operation, the photoluminescent structure 62 may exhibit periodic unicolor or multicolor illumination. For example, the controller 78 may prompt the light source 52 to periodically emit only the first wavelength of inputted light 100 via the LED sources 72 to cause the photoluminescent structure 62 to periodically illuminate in the first color. Alternatively, the controller 78 may prompt the light source 52 to periodically emit only the second wavelength of inputted light 100 via LED sources 72 to cause the photoluminescent structure 62 to periodically illuminate in the second color. Alternatively, the controller 78 may prompt the light source 52 to simultaneously and periodically emit the first and second wavelengths of inputted light 100 to cause the photoluminescent structure 62 to periodically illuminate in a third color defined by an additive light mixture of the first and second colors. Alternatively still, the controller 78 may prompt the light source 52 to alternate between periodically emitting the first and second wavelengths of inputted light 100 to cause the photoluminescent structure 62 to periodically illuminate by alternating between the first and second colors. The controller 78 may prompt the light source 52 to periodically emit the first and/or second wavelengths of inputted light 100 at a regular time interval and/or an irregular time interval.

In another embodiment, the lighting system 10 may include a user interface 134. The user interface 134 may be configured such that a user may control the wavelength of inputted light 100 that is emitted by the LED sources 72 and/or the LED sources 72 that are illuminated. Such a configuration may allow a user to control which features 148 (FIG. 7) are illuminated (e.g., member 42, ambient light, warning indicator, turn signal, etc.).

With respect to the above examples, the controller 78 may modify the intensity of the emitted first and second wavelengths of inputted light 100 by pulse-width modulation or current control. In some embodiments, the controller 78 may be configured to adjust a color of the emitted light by sending control signals to adjust an intensity or energy output level of the light source 52. For example, if the light source 52 is configured to output the first emission at a low level, substantially all of the first emission may be converted to the second emission. In this configuration, a color of light corresponding to the second emission may correspond to the color of the emitted light from the lighting system 10. If the light source 52 is configured to output the first emission at a high level, only a portion of the first emission may be converted to the second emission. In this configuration, a color of light corresponding to mixture of the first emission and the second emission may be output as the emitted light. In this way, each of the controllers 78 may control an output color of the emitted light.

Though a low level and a high level of intensity are discussed in reference to the first emission of inputted light 100, it shall be understood that the intensity of the first emission of inputted light 100 may be varied among a variety of intensity levels to adjust a hue of the color corresponding to the emitted light from the lighting system 10. The variance in intensity may be manually altered, or automatically varied by the controller 78 based on predefined conditions. According to one embodiment, a first intensity may be output from the lighting system 10 when a light sensor senses daylight conditions. A second intensity may be output from the lighting system 10 when the light sensor determines the vehicle 14 is operating in a low light environment.

As described herein, the color of the outputted light 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source 52, the concentration, types, and proportions of the photoluminescent materials 96 in the photoluminescent structure 62 discussed herein may be operable to generate a range of color hues of the emitted light by blending the first emission with the second emission.

Accordingly, a lighting system utilizing a steering assembly has been advantageously provided herein. The steering assembly retains its structural properties while providing luminescent light having both functional and decorative characteristics. In some embodiments, the light source may implement a thin design, thereby helping to fit the light source into small package spaces of the vehicle where traditional light sources may not be practicable.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lighting system for a vehicle, comprising:
    a member extending from a steering column;
    a light source having a plurality of independently illuminable sections surrounding an exterior circumference of a steering wheel and configured to illuminate a portion of the member; and
    a first photoluminescent structure disposed on the member and configured to luminesce in response to excitation by the light source, wherein at least one section of the light source is operably coupled with the photoluminescent structure as the steering wheel is rotated.

2. The lighting system for a vehicle of claim 1, wherein the light source comprises a plurality of printed LEDs.

3. The lighting system for a vehicle of claim 2, wherein the first photoluminescent structure comprises at least one photoluminescent material configured to down convert an inputted light received from at least a portion of the light source into a visible light that is outputted to a viewable portion.

4. The lighting system for a vehicle of claim 3, wherein the member is configured as a stalk switch that controls at least one function of the vehicle and the first photoluminescent structure is configured as indicia disposed on the stalk switch.

5. The lighting system for a vehicle of claim 1, further comprising:
    a second photoluminescent structure disposed on the light source configured to provide backlighting of the steering wheel when illuminated.

6. The lighting system for a vehicle of claim 1, further comprising a controller for controlling an activation state of the light source in response to at least one vehicle-related condition.

7. The lighting system for a vehicle of claim 1, wherein sequential portions of the light source are illuminated to continually emit light towards a predefined location as the steering wheel is rotated.

8. A lighting system, comprising:
    a steering wheel having a hub and a rim connected to the hub through a spoke;
    a plurality of light sources disposed circumferentially around the hub in a plurality of independently illuminable and varied concentration portions; and
    a member having a first luminescent structure thereon and configured to luminesce in response to excitation by at least a portion of the plurality of light sources.

9. The lighting system of claim 8, wherein the plurality of light sources comprise a printed LED.

10. The lighting system of claim 8, wherein sequential portions of the plurality of light sources are illuminated to continually emit light towards a predefined location as the steering wheel is rotated.

11. The lighting system of claim 8, wherein the first luminescent structure is configured as indicia that notify an occupant of a function of the member.

12. The lighting system of claim 9, wherein the first luminescent structure comprises at least one luminescent material configured to down convert an inputted light received from at least a portion of the printed LED into a visible light that is outputted to a viewable portion.

13. The lighting system of claim 8, further comprising:
    a second luminescent structure separated from the steering wheel configured to luminesce in response to excitation by the plurality of light sources.

14. The lighting system of claim 13, wherein the first luminescent structure illuminates in a first color and the second luminescent structure illuminates in a second color.

15. A lighting system for a vehicle steering assembly, comprising:
    a switch extending from a steering column of a vehicle;
    a light source disposed within the vehicle;
    a first photoluminescent structure disposed on the switch, wherein the first photoluminescent structure is configured to luminesce in response to excitation by light output from at least a portion of the light source;
    a second photoluminescent structure disposed on the light source configured to provide ambient lighting vehicle forward of a steering wheel; and
    a third photoluminescent structure disposed on a feature disposed within a vehicle and separated from the steering assembly.

16. The lighting system for a vehicle steering assembly of claim 15, wherein the light source comprises a plurality of printed LEDs.

17. The lighting system for a vehicle steering assembly of claim 16, wherein the first photoluminescent structure comprises at least one photoluminescent material configured to down convert an inputted light received from at least a portion of the light sources into a visible light that is outputted to a viewable portion.

18. The lighting system for a vehicle steering assembly of claim 17, wherein the inputted light comprises one of blue light, violet light, and UV light.

19. The lighting system for a vehicle steering assembly of claim 15, wherein sequential portions of the light source are illuminated to continually emit light towards a predefined location as a steering wheel is rotated.

20. The lighting system for a vehicle steering assembly of claim 15, wherein the first photoluminescent structure luminesces in a first color and the second photoluminescent structure luminesces in a second color.

* * * * *